United States Patent
Heller et al.

(10) Patent No.: US 9,592,967 B2
(45) Date of Patent: Mar. 14, 2017

(54) PREFORM CONVEYING APPARATUS AND METHOD

(71) Applicant: KHS CORPOPLAST GMBH, Hamburg (DE)

(72) Inventors: Alexander Heller, Bargteheide (DE); Dieter Holler, Rümpel (DE)

(73) Assignee: KHS CORPOPLAST GMBH, Hamburg (DE)

(*) Notice: Subject to any disclaimer, the term of this patent is extended or adjusted under 35 U.S.C. 154(b) by 0 days.

(21) Appl. No.: 14/406,495

(22) PCT Filed: Jun. 16, 2013

(86) PCT No.: PCT/EP2013/001780
§ 371 (c)(1),
(2) Date: Dec. 8, 2014

(87) PCT Pub. No.: WO2013/185932
PCT Pub. Date: Dec. 19, 2013

(65) Prior Publication Data
US 2015/0151457 A1    Jun. 4, 2015

(30) Foreign Application Priority Data

Jun. 15, 2012 (DE) .................. 10 2012 011 761

(51) Int. Cl.
*B29C 31/08* (2006.01)
*B65G 47/244* (2006.01)
(Continued)

(52) U.S. Cl.
CPC ............ *B65G 47/24* (2013.01); *B29C 31/008* (2013.01); *B29C 31/085* (2013.01);
(Continued)

(58) Field of Classification Search
CPC .......... B29C 31/085; B29C 2049/4231; B29C 49/4205; B65G 47/24; B65G 47/2445; B65G 47/26; B65G 15/20
See application file for complete search history.

(56) References Cited

U.S. PATENT DOCUMENTS 4,076,071 A    2/1978  Rosenkranz
4,507,039 A    3/1985  Sawa et al.
(Continued)

FOREIGN PATENT DOCUMENTS

CA        1130520 A2    8/1982
CH         698447 B1    8/2009
(Continued)

*Primary Examiner* — Thomas Randazzo
(74) *Attorney, Agent, or Firm* — Lucas & Mercanti, LLP; Klaus P. Stoffel

(57) ABSTRACT

An apparatus and a method for conveying preforms, to a blow molding machine. The apparatus includes a conveying device which conveys preforms away from a supply of preforms, a feeding device that receives preforms from the conveying device, and a sorting device that sorts the preforms and conveys them in a direction of travel. The conveying device ends above the sorting device. The inlet end of the feeding device has a holding zone which the preforms reach as they arrive from the conveying device, and the discharge end of the feeding device has a transfer zone via which the preforms reach the sorting device. The feeding device has an orienting zone with an orienting device designed so that the flow of preforms is oriented in the direction of the flow of the preforms in the sorting device (direction of travel), and the oriented preforms run through the transfer zone.

16 Claims, 4 Drawing Sheets

(51) Int. Cl.
*B65G 47/26* (2006.01)
*B65G 47/24* (2006.01)
*B29C 31/00* (2006.01)
*B29C 49/42* (2006.01)

(52) U.S. Cl.
CPC ...... *B29C 49/4205* (2013.01); *B65G 47/2445* (2013.01); *B65G 47/26* (2013.01); *B29C 2049/4231* (2013.01)

(56) References Cited

U.S. PATENT DOCUMENTS

| | | | | |
|---|---|---|---|---|
| 5,346,386 | A | 9/1994 | Albrecht et al. | |
| 6,968,936 | B2* | 11/2005 | Charpentier | B65G 47/1428 198/389 |
| 7,322,458 | B1* | 1/2008 | McDonald | B29C 49/4205 198/389 |
| 7,472,783 | B2* | 1/2009 | Mouette | B65G 47/2445 198/415 |
| 8,109,381 | B2 | 2/2012 | Deyerl | |
| 8,342,316 | B2* | 1/2013 | Zoppas | B29C 49/4205 198/397.04 |
| 8,512,031 | B2* | 8/2013 | Linke | B29C 49/4205 198/803.12 |
| 8,544,636 | B2* | 10/2013 | Zoppas | B29C 49/4205 198/377.07 |
| 8,556,620 | B2* | 10/2013 | Parrinello | B29B 11/12 198/347.1 |
| 8,607,962 | B2* | 12/2013 | Seidl | B65G 47/256 198/398 |
| 8,783,469 | B2* | 7/2014 | Beutl | B29C 49/4205 209/522 |
| 2004/0144618 | A1* | 7/2004 | McDonald | B65G 15/14 198/389 |
| 2008/0226763 | A1* | 9/2008 | Charpentier | B07C 5/02 425/534 |
| 2010/0006588 | A1* | 1/2010 | Klaiber | B29C 49/4205 221/200 |
| 2010/0193325 | A1* | 8/2010 | Charpentier | B65G 47/24 198/382 |
| 2011/0108468 | A1 | 5/2011 | Tanner | |
| 2011/0260370 | A1* | 10/2011 | Lize | B29C 49/6418 264/481 |

FOREIGN PATENT DOCUMENTS

| | | |
|---|---|---|
| CN | 1332077 A | 1/2002 |
| CN | 2712611 Y | 7/2005 |
| DE | 2352926 A1 | 4/1975 |
| DE | 2917241 A1 | 11/1979 |
| DE | 4212583 A1 | 10/1993 |
| DE | 20308513 U1 | 7/2004 |
| DE | 102010042333 A1 | 4/2012 |
| EP | 2072427 A1 | 6/2009 |
| FR | 2802903 A1 | 6/2001 |
| WO | 2006082604 A1 | 8/2006 |

* cited by examiner

PREFORM CONVEYING APPARATUS AND METHOD

The present application is a 371 of International application PCT/EP2013/001780, filed Jun. 16, 2013, which claims priority of DE 10 2012 011 761.2, filed Jun. 15, 2012, the priority of these applications is hereby claimed and these applications are incorporated herein by reference.

BACKGROUND OF THE INVENTION

In the process of forming containers by the action of blowing pressure, preforms of a thermoplastic material such as preforms of PET (polyethylene terephthalate) are sent to various processing stations within a blow-molding machine. A blow-molding machine of this type typically comprises a heating device and a blowing device, in the area of which the previously tempered preform is expanded into a container by biaxial orientation. The expansion occurs by means of compressed air, which is introduced into the preform to be expanded. The course of the processing technology involved in a preform expansion of this type is explained in DE-OS 43 40 291. The basic configuration of a blow-molding station for forming containers is described in DE-OS 42 12 583. Possibilities for tempering the preforms are explained in DE-OS 23 52 926.

There are two alternative ways in which the preforms can be sent to the blow-molding machine. In the case of the so-called "one-step" method, the preforms are produced by an injection-molding process, and, immediately after they have been injection-molded, they are transported directly to the blow-molding machine by a conveying apparatus. In the case of the so-called "two-step" method, the preforms are first produced by an injection-molding process and then stored; they are conditioned with respect to their temperature and then blown into containers only at a later time. The production of the preforms and the blow-molding of the preforms into containers can take place at different times and at different places.

Both methods have in common that the preforms are sent the blow-molding machine by a conveying apparatus. Known apparatuses consist of, for example, a vertical conveyor, by which the preforms, which are stored in a collecting bin, are transported to a conveying device. By means of the conveying device, usually a conveyor belt, the preforms are transported to a sorting device. This sorting device has the task of orienting the preforms into a defined position so that they can be transferred to, for example, a downline blow-molding machine. Known sorting devices (so-called roll sorters) consist, for example, of two conveying rolls, which rotate in opposite directions and between which a small gap remains, which is selected in such a way that the preforms can be held, suspended by their collars, between the rotating conveying rolls. The conveying rolls are arranged at an angle, so that the preforms slide down the incline, i.e., in the conveying direction, along the conveying rolls. In this way the preforms are sorted, suspended between the rotating rolls, and then conveyed in the conveying direction to, for example, the blow-molding machine. As a rule, the conveying device upstream of the sorting device is arranged in such a way that that the preforms drop onto the sorting device upon reaching the end of the conveying device, e.g., by gravity from the end of the conveyor belt. To prevent the preforms from bouncing back out of the sorting device when they land, a feed device is usually provided between the conveying device and the sorting device. This feed device is configured so that it surrounds the transfer one between the conveying device and the sorting device, so that the falling and bouncing preforms strike the side walls of the feed device and then fall back down into the sorting device. The task of the feed device is to facilitate the sorting of the preforms.

Deflecting devices are also usually provided in the feed device. These deflecting devices can be in the form of slide plates, for example, by means of which the speed at which the preforms are dropping can be reduced, as a result of which the bouncing of the preforms is decreased.

In the known feed devices, the deflecting devices are arranged in such a way that some of the falling preforms are guided along the deflecting device in a direction opposite to the conveying direction of the preforms in the sorting device ("the conveying direction" below), either dropping straight down into the sorting device or sideways, transversely to the conveying direction. This orientation has the result that the speed of the preforms as they land on the sorting unit decreases to practically zero. Then the preforms are conveyed further along and oriented by the conveying aids provided in the sorting unit.

The disadvantage of this known apparatus is that the flow rate of the preforms can be increased only up to a certain throughput. A throughput beyond this point, such as that required for high-performance blow-molding machines, for example, is not possible with the known apparatuses. The conveying performance of smaller systems, furthermore, can be increased.

SUMMARY OF THE INVENTION

The goal of the present invention is therefore to provide a method and an apparatus for conveying preforms to, for example, a blow-molding machine by means of which the throughput required by a high-performance blow-molding machine can be realized.

The apparatus according to the invention for conveying preforms to a blow-molding machine for the production of containers from a thermoplastic material comprises a conveying device, a feed device, and a sorting device, wherein the conveying device ends above the sorting device, and the feed device comprises a receiving zone, into which the preforms drop as they leave the conveying device. The feed device also comprises a transfer zone, by way of which the preforms arrive in the sorting device. According to the invention, the feed device also comprises an orienting zone, which is configured in such a way that the flow of preforms in the feed device is oriented in the direction of the flow of preforms in the sorting device. The preforms are to be oriented in such a way that, when they are transferred to the sorting device, the direction in which they are moving already corresponds to the conveying direction. In this oriented state, the preforms are then fed to the sorting device.

The present invention offers the advantage that, as a result of the early orientation of the preforms in the conveying direction, that is, while they are still in the feed device, the preforms already comprise, upon entry into the sorting device, a kinetic energy acting in the direction of the flow being conveyed, so that, when the preforms are transferred to the sorting device, they do not have to be decelerated by the sorting device first before being accelerated again; on the contrary, the kinetic energy of the preforms acquired in the feed device is exploited advantageously to facilitate the flow of preforms in the sorting device. In this way, the throughput of the preforms can be advantageously increased, so that the apparatus according to the invention can be used in particular for high-performance blow-molding machines as well.

According to an advantageous embodiment of the invention, the receiving zone of the feed device is configured and arranged relative to the discharge end of the upstream conveying device in such a way that the preforms coming from the conveying device drop by gravity into the receiving zone.

According to another advantageous embodiment of the invention, the orienting zone comprises a chute, which is oriented so that the flow of preforms is directed toward the sorting device. The use of a chute in the orienting zone offers the advantage that the flow of preforms along the chute can be easily oriented in the conveying direction of the flow. In addition, a chute offers the advantage that, by means of the appropriate selection of the chute's angle, the speed at which the preforms are transferred to the sorting device can be set as desired. For this purpose, the angle of inclination of the chute is preferably adjustable, and it is preferably automatically controlled. The chute angle could be automatically adapted and set by means of a control unit as a function of a selected or desired flow rate, for example.

It is also advantageous for the orienting zone of the feed device to be arranged under the receiving zone in such a way that the preforms coming from the receiving zone fall directly or indirectly onto the chute. Thus, according to another advantageous embodiment of the invention, deflecting devices can be provided in the feed device and/or at the beginning of the sorting device; these deflecting devices offer the advantage that the speed at which the preforms drop is reduced before they land on the chute, which results in the advantage that the bouncing of the preforms after landing on the chute can be reduced. In addition, it also possible to achieve the result that all of the preforms travel the same distance along the chute and therefore acquire a relatively uniform speed.

According to another advantageous embodiment of the invention, the sorting device is configured as a roll sorter, which consists of two conveying rolls, which are arranged parallel to each other and rotate in opposite directions. This embodiment offers the advantage that the preforms can be sorted, suspended, along the gap provided between the conveying rolls and can be conveyed, possibly with the help of additional conveying means, by the rotational movement of the conveying rolls and by a gradient set in the conveying direction to a downstream processing machine such as a blow-molding machine.

Another advantageous embodiment of the invention provides for a funnel arranged at the bottom end of the transfer zone, e.g., at the end of the chute; the tapered end of this funnel is arranged more-or-less centrally above the conveying rolls of the sorting device. The provision of a funnel offers the advantage that the preforms pass directly from the tapered end of the funnel onto the conveying rolls and quickly assume the desired suspended position.

According to another embodiment of the invention, guide devices are advantageously provided in the sorting device, these guides being arranged directly above the conveying rolls and extending, for example, from the funnel to the conveying rolls. It is considered advantageous for the guide device to taper down on the inlet side at first from an inlet cross section to a narrowed point with a smaller free diameter and then to increase in size again from this narrowed point toward the discharge end to a "free" diameter. The side walls extending in the direction in which the preforms drop should comprise a continuously curved contour, especially a stepless and kink-free contour. The outlet of the guide device should be arranged more-or-less centrally above the conveying rolls of the sorting device. In this way, a closed system of preform flow guidance is realized extending from the chute, to the funnel, and into the sorting device.

The present invention also pertains to a method for conveying preforms.

In the method according to the invention, the preforms coming from a conveying device are fed to a sorting device and then conveyed to, for example, a blow-molding machine for the production of containers from a thermoplastic material. The conveying device ends above the sorting device, and the preforms pass from the conveying device to the sorting device by way of a feed device. According to the invention, the flow of preforms in the feed direction is oriented in the direction of the flow of the preforms in the sorting device, and the preforms leave the feed device in this oriented state.

According to an advantageous embodiment of the method, the preforms coming from the conveying device drop by gravity into a receiving zone of the feed device.

It is also proposed that the preforms coming from the receiving zone arrive in an orienting zone, in which the preforms are oriented in the direction of the preform flow of the sorting device, wherein the preforms are oriented by, for example, a chute arranged in the orienting zone. What is important here is the direction of movement. This chute is preferably slanted in such a way that the preforms travel into the sorting device at a desired speed, wherein, in addition, it is advantageous for the inclination of the chute to be variably adjustable, especially adjustable automatically by a control unit, in particular to adapt to a change in the desired flow rate in the sorting device.

According to another advantageous embodiment of the invention, the preforms are transferred to the sorting device in a transfer zone located at the end of the orienting zone.

In the following, the invention is explained in greater detail on the basis of several exemplary embodiments, which are shown in the figures:

DETAILED DESCRIPTION OF THE INVENTION

Figure 1:
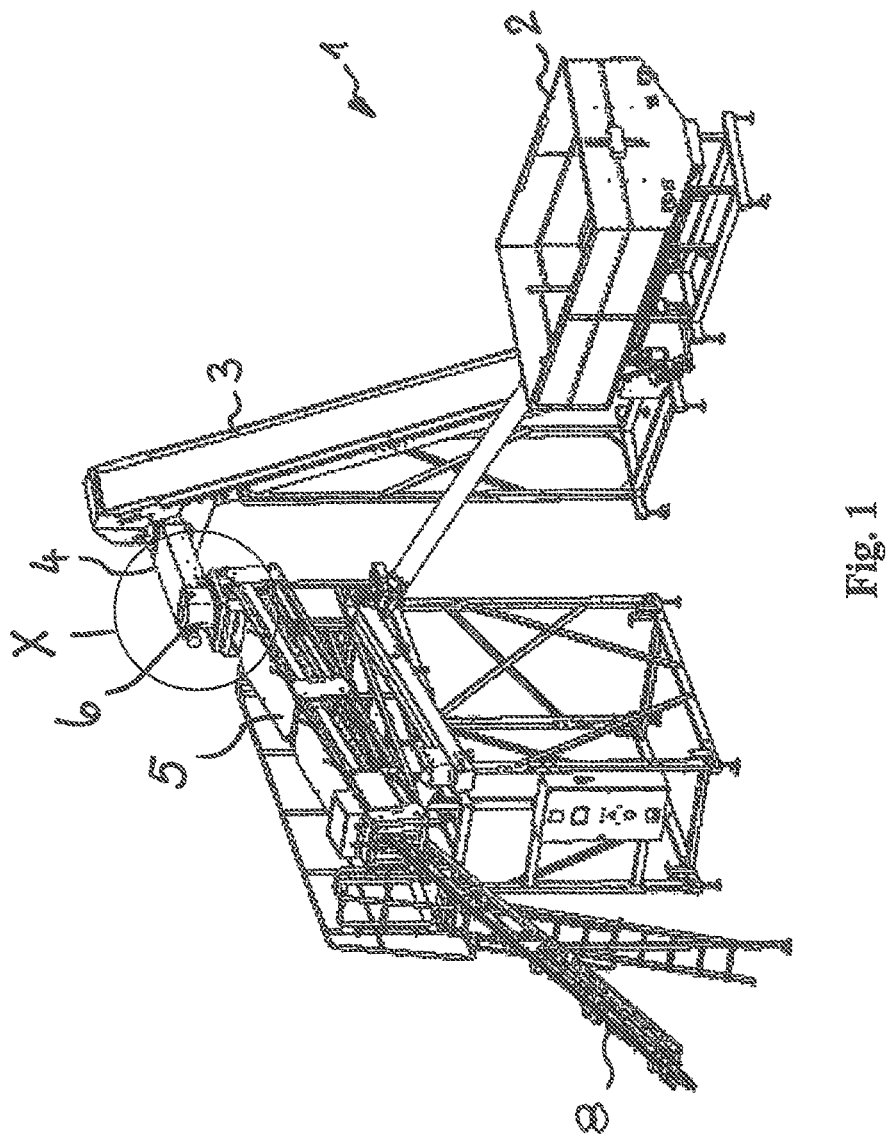
FIG. 1 shows an apparatus for conveying preforms to a blow-molding machine for the production of containers from a thermoplastic material.

FIG. 1 shows an apparatus 1 for conveying preforms to, for example, a blow-molding machine for the production of PET bottles. The apparatus consists of a collecting bin 2, in which a supply of preforms is provided. From the collecting bin 2, the preforms are conveyed by a vertical conveyor 3 to the inlet end of a conveying device 4. The other end of the conveying device 4, i.e., its discharge end, is arranged above a sorting device 5, wherein a feed device 6 is provided between the conveying device 4 and the sorting device 5 to ensure the orderly transfer of the preforms with a minimum of disruption. From the sorting device 5, the sorted preforms travel onward to a second conveying device 8, by means of which the preforms are conveyed into the blow-molding machine (not shown).

Figure 2:
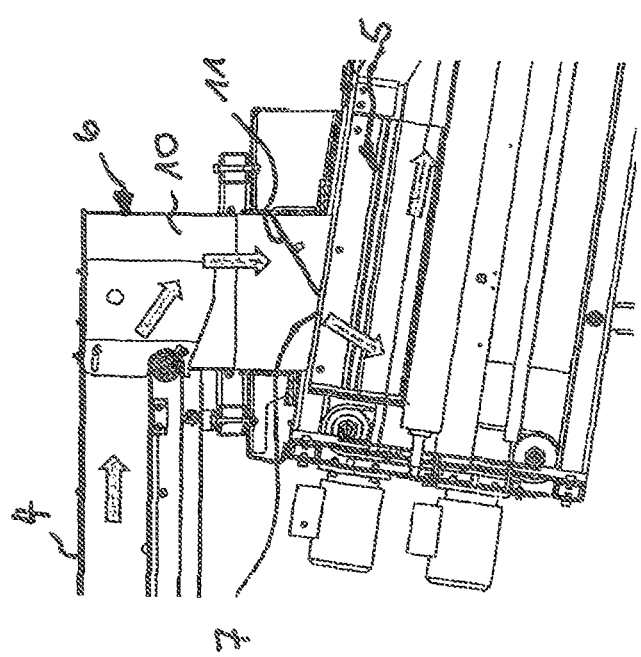
FIG. 2 shows a cross-sectional view of the detail marked "X" in FIG. 1, wherein a diagram of the prior art is illustrated.

FIG. 2 shows a cross-sectional side view of the detail marked "X" in FIG. 1, wherein the direction in which the preforms are flowing in the different areas is illustrated by the arrows.

After reaching the discharge end of the conveying device 4, the preforms drop into the receiving zone 10 of the feed device 6 and are deflected by a deflecting device 11 during their free fall. In the example shown here, this deflecting device 11 is a baffle plate arranged at an angle. After that, the preforms drop into the sorting device 5 by way of a transfer zone 7.

As can be derived from FIG. 2 the basis of the arrows, the flow of preforms is deflected by the deflecting device 11 in such a way that the free fall of the preforms is braked and the speed at which they drop is reduced. In addition, the preforms are guided by the deflecting device 11 in a direction opposite the conveying direction, so that, as they arrive in the sorting device, the preforms are initially slowed down, wherein then the preforms must be accelerated again in the sorting device 5.

Figure 3:
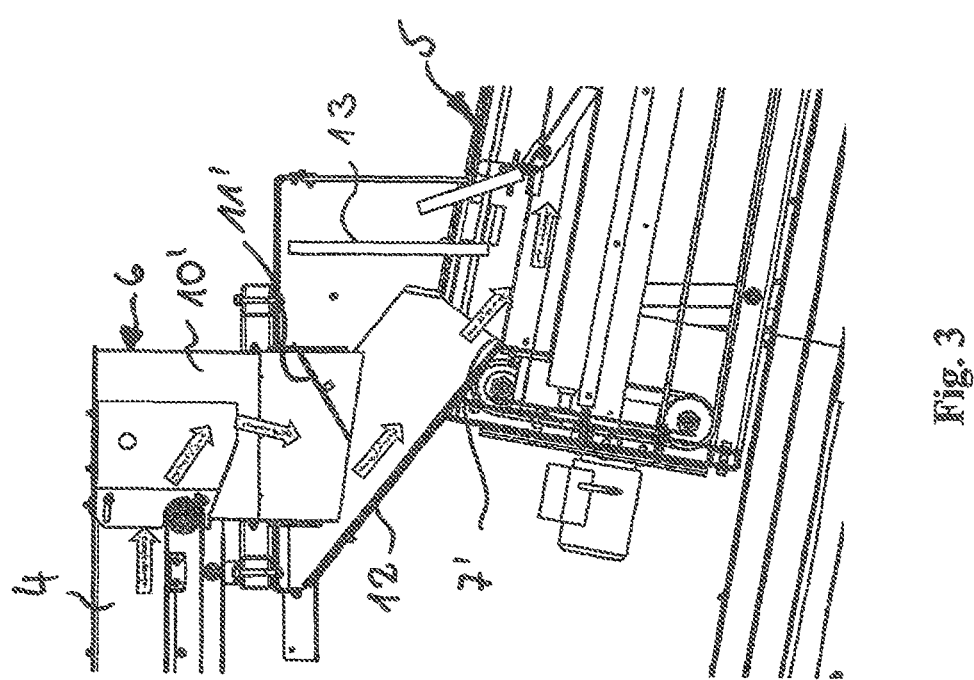
FIG. 3 shows a cross-sectional view of the detail marked "X" in FIG. 1, wherein a first exemplary embodiment according to the invention is shown.

In contrast, FIG. 3 shows a cross-sectional side view of the detail marked "X" in FIG. 1 according to an exemplary embodiment according to the invention.

In FIG. 3, the direction in which the preforms are flowing is again indicated by the arrows. The preforms are guided over the discharge end of the conveying device 4 into the receiving zone 10' of the feed device 6. In this exemplary embodiment according to the invention, however, an orienting zone, here in the form of a chute 12, is installed upstream of the transfer zone 7', wherein the chute 12 is arranged in such a way that it ends above the sorting device 5. In addition, baffle walls 13 are provided above the sorting device 5; these walls have the task of guiding "bouncing" preforms back into the sorting device and thus prevent the preforms from bouncing in the conveying direction and coming to rest on preforms which have already been sorted.

According to FIG. 3, the preforms in the exemplary embodiment according to the invention flow from the conveying device 4 to the receiving zone 10' and from there to the deflecting device 11'. The preforms then drop from the deflecting device 11' onto the upper part of the chute 12. Because the chute is set at an angle, the preforms slide down the chute 12 and are thus accelerated. Because the direction in which the chute 12 is aimed is the same as the direction in which the preforms flow in the sorting device 5 (conveying direction), the preforms on the chute 12 acquire the same flow direction as the conveying direction. The result of this is that the preforms have a certain speed as they land on the sorting device 5, a speed which is aimed in the same direction as the conveying direction, as a result of which, without any additional braking or accelerating, a speedy further transport of the preforms through the sorting device 5 is made possible. The inclination of the chute, for example, can be adjusted to give the preforms a desired speed, for example. This speed can be selected so that it is the same as the conveying speed in the sorting device. This adjustment is preferably carried out automatically by means of a control unit, which controls actuators, for example, which adjust the height of the bottom end of the chute relative to the top end of the chute. The control unit can be configured in such a way that, when there is a change in the flow rate of the sorting device, the angle of the chute is also adjusted automatically to suit.

Figure 4:
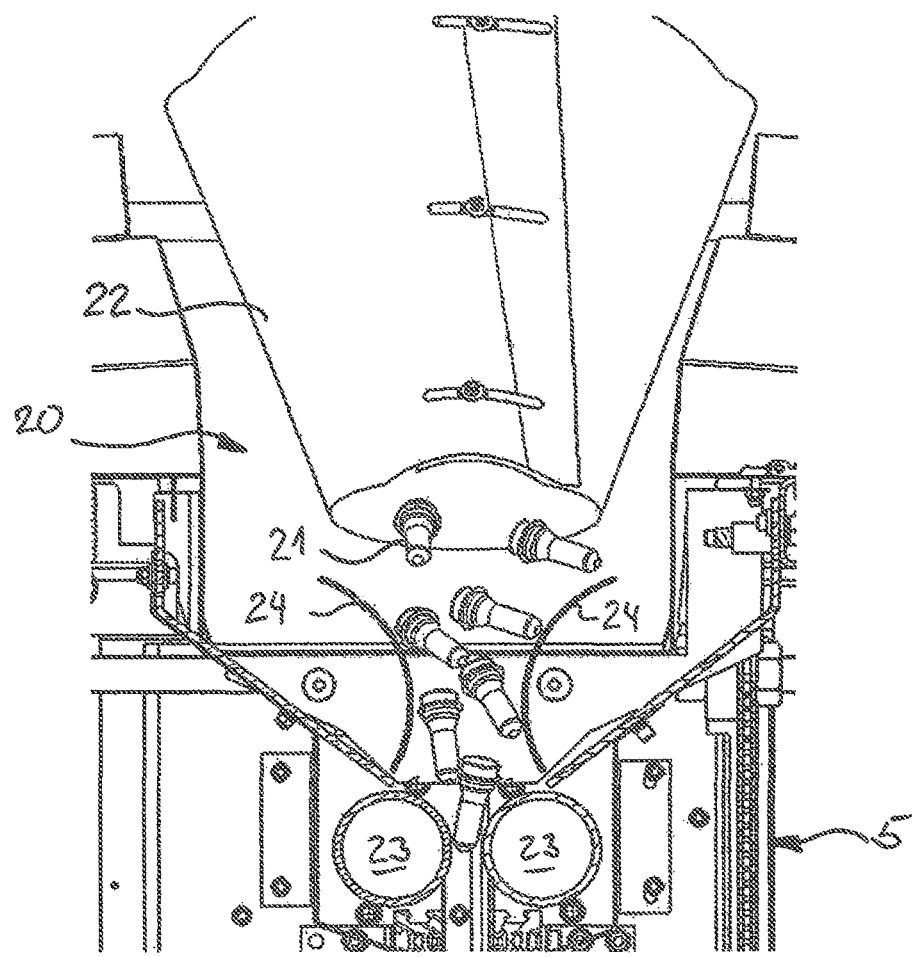
FIG. 4 shows a cross-sectional view of the detail marked "X" in FIG. 1, wherein another exemplary embodiment according to the invention is shown.

FIG. 4 shows a front view of the detail marked illustrating another exemplary embodiment according to the invention.

FIG. 4 shows a transfer zone 20 of the feed device 6. By means of the transfer zone 20, the preforms 21 coming from the orienting zone are conducted into the sorting device 5, wherein the orienting zone can comprise a chute 12, for example. For this purpose, the transfer zone 20 comprises a funnel 22, into which the preforms coming from the chute 12 drop or into which the chute merges. The orientation of the longitudinal axis of the funnel 12 preferably corresponds to the angle of inclination of the chute 12, so that the preforms 21 in the funnel 12 retain the orientation acquired in the chute 12.

The sorting device 5 comprises two conveying rolls 23, arranged parallel to each other, by which the preforms 21 are oriented and conveyed to the blow-molding machine. Above the conveying rolls 23, furthermore, a guide device is provided, which is formed out of curved guide plates 24. The guide plates 24 are arranged in such a way that the preforms 21 coming directly from the funnel 22 are guided directly onto the conveying rolls 23. In this way, in the transfer zone 20 described according to the exemplary embodiment, the orientation of the preforms 21 realized in the orienting zone carried over through the transfer zone to the sorting device 5.

Insofar as a directional orientation or a speed orientation of the preforms has been spoken of above and in the claims, what is to be understood in all cases is the velocity component of the preforms in the conveying direction. In addition, the preforms also always comprise a velocity component in the direction in which they fall.

The invention claimed is:

1. An apparatus for conveying preforms to a blow-molding machine for production of containers from a thermoplastic material, comprising:
    a conveying device that conveys preforms from a supply of preforms;
    a feed device that is supplied with preforms from the conveying device; and
    a sorting device that sorts the preforms and conveys the preforms in a conveying direction at a conveying speed, wherein the conveying device is arranged to end above the sorting device, wherein the feed device has an inlet side with a receiving zone in which the preforms coming from the conveying device arrive, and a discharge side with a transfer zone via, which the preforms arrive at the sorting device, the feed device further including an orienting zone with an orienting device configured so that, in the orienting zone, a flow of the preforms is oriented in a conveying direction of a flow of the preforms in the sorting device, the preforms passing through the transfer zone with this orientation, wherein the sorting device is a roll sorter having two conveying rolls arranged parallel to each other and rotating in opposite directions, a gap being formed between the conveying rolls.

2. The apparatus according to claim 1, wherein the receiving zone of the feed device is configured and arranged so that the preforms coming from the conveying device drop by gravity into the receiving zone.

3. The apparatus according to claim 1, further comprising deflecting devices provided in the feed device and/or at an inlet end of the sorting device.

4. The apparatus according to claim 1, wherein the orienting device is a chute aimed in the conveying direction of the sorting device.

5. The apparatus according to claim 4, wherein the chute has an angle of inclination so that a speed of the preforms in the transfer zone at least approximates the conveying speed of the sorting device.

6. The apparatus according to claim 1, wherein a funnel is arranged at a bottom end of the transfer zone of the feed device, a tapered end of the funnel being arranged directly above the sorting device.

7. The apparatus according to claim 6, further comprising at least one guide device provided in the sorting device and adjoining a bottom end of the funnel.

8. A method for conveying preforms to a blow-molding machine for producing containers from a thermoplastic material, the method comprising the steps of: conveying the preforms with a conveying device to a feed device; guiding the preforms from the conveying device to a sorting device using the feed device, wherein the sorting device is a roll sorter having two conveying rolls arranged parallel to each other and rotating in opposite directions, a gap being formed between the conveying rolls; and sorting the preforms in the sorting device by rotating the two conveying rolls in opposite directions and conveying the preforms in a conveying direction at a conveying speed, wherein the conveying device is arranged to end above the sorting device, wherein, in the feed device, the flow of the preforms is oriented in the conveying direction of a flow of the preforms in the sorting device.

9. The method for conveying preforms according to claim 8, wherein the preforms coming from the conveying device drop by gravity into a receiving zone of the feed device.

10. The method according to claim 9, wherein the preforms coming from the receiving zone arrive in an orienting zone in which the preforms are oriented in the conveying direction.

11. The method according to claim 10, including orienting the preforms with a chute arranged in the orienting zone.

12. The method according to claim 10, including guiding the preforms at an end of the orienting zone into the sorting device with a funnel.

13. The method according to claim 10, including bringing the preforms up to the conveying speed in the orienting zone.

14. The method according to claim 13, wherein the speed to which the preforms are brought in the orienting zone is adjustable.

15. The method according to claim 14, including automatically adjusting the speed of the preforms in the orienting zone using a control unit.

16. The method according to claim 14, including adjusting the speed of the preforms in the orienting zone as a function of a change in the conveying speed.

* * * * *